3,235,333
**PROCESS FOR PRODUCING CARBONYL-
SULFIDE**
Edward A. Swakon, Hammond, Ind., and Edmund Field, Chicago, Ill., assignors to Standard Oil Company, Chicago, Ill., a corporation of Indiana
No Drawing. Filed Mar. 7, 1961, Ser. No. 93,859
7 Claims. (Cl. 23—203)

This invention relates to the preparation of carbonyl sulfide and more specifically pertains to the preparation of carbonyl sulfide by the reaction of carbon monoxide with sulfur.

It has been long known that carbonyl sulfide can be prepared by reacting carbon monoxide and sulfur. For example, C. Thann, Ann., 5, Supp. 273 (1867), discloses that carbonyl sulfide is obtained when a mixture of carbon monoxide and sulfur vapors are passed through a glowing tube. G. N. Lewis et al. in J.A.C.S. 37, 1976 (1915), reported the preparation of carbonyl sulfide by the treatment of an excess of sulfur with carbon monoxide in glass apparatus at 302° C. In U.S. Patent 2,494,587 there is disclosed the direct combination of elemental sulfur with carbon monoxide in the presence of a hydrosilicate of aluminum to form carbonyl sulfide.

In general, it is well known that carbon monoxide and sulfur will react to produce carbonyl sulfide at high temperatures; i.e., temperatures of 300° C. and above. It is also known that such high temperature reactions for the production of carbonyl sulfide are slow, for example they are reported as producing about 80 mole percent in 24 hours.

It is known that carbonyl sulfide can be reacted with ammonia and primary amines to produce urea and substituted ureas. It has been long known that urea should be produced from carbonyl sulfide and ammonia in yields twice that obtained from the reaction of ammonia and carbon dioxide. It has also been known that the reaction of ammonia with carbonyl sulfide should be much faster than that with carbon dioxide. For example, see C.A. 24, 5581 (1930), Alfone, Klemenc, Z. anorg. allgem. Chem. 191, 246–82 (1930). However, even as late as September 21, 1958, it is reported in U.S. Patent 2,857,430 that a major drawback with respect to the use of carbonyl sulfide as a reactant in producing urea and substituted ureas is the difficulty and the cost of producing carbonyl sulfide.

A process has now been discovered for the preparation of carbonyl sulfide which overcomes the drawbacks of the prior art processes. The process of this invention comprises reacting carbon monoxide with sulfur in the presence of catalytic amounts of an alkaline catalyst. The use of an alkaline catalyst permits the production of carbonyl sulfide at high hourly rates and high molar conversion, up to 90 mole percent and higher, of sulfur to carbonyl sulfide. The use of alkaline catalyst provides increased rates of production of carbonyl sulfide at temperatures of from 300° C. and above but, even more important, provides a process whereby carbonyl sulfide can be prepared at high rates and high molar conversion of sulfur at temperatures well below 300° C. Suitable reaction temperatures for the process of this invention are temperatuers of from above 50° C., in the range of 50 to 500° C., desirably in the range of 65 to 200° C. and preferably in the range of 80 to 150° C. According to the process of this invention, carbon monoxide and sulfur are reacted in the presence of catalytic amounts of an alkaline catalyst in a carbon monoxide atmosphere provided by carbon monoxide pressures of up to 1,000 atmospheres. Suitable carbon monoxide pressures (or carbon monoxide partial pressures with inert diluent gas such as hydrogen) are in the range of from 200 to 5,000 p.s.i.g., desirably in the range of from 500 to 1000 p.s.i.g.

The use of the term "alkaline catalyst" in defining the process of this invention is employed to designate the catalytic material in the classical use of the term "catalyst"; i.e., the alkaline catalyst is the material which influences the reaction but does not per se enter into the reaction. The term "catalytic amounts" of the alkaline catalyst used in the process of this invention are those amounts of catalyst which provide a recognizable acceleration of rate of reaction between carbon monoxide and sulfur. Suitable amounts of alkaline catalyst are in the range of from 0.001 to 2.0 mole percent based on the sulfur. More desirably, the range of catalyst based on sulfur is from 0.01 to 20 mole percent and preferably from 0.05 to 10 mole percent. Although ammonia and primary amines may be considered to supply the necessary alkalinity for the reaction between monoxide and sulfur to enhance the rate of production of carbonyl sulfide, those alkaline materials will react with carbonyl sulfide and/or carbon monoxide and sulfur to produce ureas under the conditions by which the process of this invention is carried out, and such alkaline materials are rapidly consumed and are no longer available as catalysts. Suitable alkaline materials to be used as catalysts for the process of this invention include organic as well as inorganic compounds. Suitable alkaline catalysts are compounds having a basic dissociation constant ($K_B$) greater than $1.4 \times 10^{-14}$. The organic bases which can be used in the process of this invention include tetraalkylguanidines, especially tetramethylguanidines. Also suitable as alkaline catalysts are the alcoholates of metals of Groups I, II and III of the periodic table, especially such as sodium methoxide, sodium ethoxide, potassium methoxide, potassium ethoxide, aluminum isopropylate and the like. Especially useful alkaline catalysts include potassium hydroxide, sodium hydroxide, calcium oxide or hydroxide, barium hydroxide, potassium formate, sodium formate, calcium formate, barium formate, potassium acetate, sodium acetate, calcium acetate, barium acetate, potassium amide, sodium amide, calcium amide and barium amide, among others.

The process of this invention can be advantageously carried out in the presence of a reaction medium which can be maintained as a liquid under the reaction conditions and which is inert to carbon monoxide, sulfur, carbonyl sulfide and other materials essential to the process of this invention. Suitable reaction mediums include the lower alkanols such as methanol, ethanol, n-propanol, isopropanol, n-butanol, and isobutanol. Hydrocarbons such as heptane, hexane, cyclohexane, benzene, toluene and xylenes can be used as the reaction medium for the process of this invention. Also, chlorinated hydrocarbons such as ethylene chloride, chloroform and carbon tetrachloride may be used as reaction mediums.

Also useful for the process of this invention are solvents for sulfur including carbon disulfide.

The process of this invention may be carried out without the use of a non-reactant as reaction medium. For example, the process of this invention may be carried out by reacting at a temperature above 90° C. carbon monoxide with sulfur maintained in a carbon monoxide atmosphere using as the source of catalyst, for example, sodium methoxide, tetramethylguanidine or sodium or potassium hydroxides. Since the catalyst is not consumed in such a process, carbonyl sulfide can be made continuously merely by adding to a closed reaction system molten sulfur and carbon monoxide and drawing off from the reaction vessel a mixture of carbon monoxide and carbonyl sulfide. The carbonyl sulfide can be separated from the gaseous mixture by passing the mixture through a suitable condensing system, for example a condenser cooled by a mixture of Dry Ice and acetone or any other suitable cooling medium which will condense out the carbonyl sulfide which has a boiling point of −50° C. at atmospheric pressure can be employed. Carbonyl sulfides can be readily condensed at elevated pressures by the use of water cooled condensers operated at elevated pressure.

The process of this invention can be illustrated by the following specific examples.

*Example 1*

A 300 ml. stainless steel rocking reactor is charged with 10 g. tetramethylguanidine, 16 g. sulfur, 100 ml. methanol and 880 p.s.i. CO, at ambient temperature. After 1.5 hours, the pressure dropped to 825 p.s.i. The rocking reactor is heated to 82° C. and the pressure drops during heating. The pressure is 325 p.s.i.g. at 82° C. The reactor is repressured to 875 p.s.i.g. and the pressure drops another 100 p.s.i.g. Total reaction time after heating the reactor is 90 minutes. The final pressure on cooling to room temperature is 525 p.s.i.g. The vent gases are passed through a Dry Ice-acetone trap and about 24 grams of colorless liquid is collected. Some of the colorless liquid is vaporized into an IR gas cell and analyzed. It is found that the colorless liquid is COS. Also, the material subjected to analysis by mass spectroscopy is identified as COS. No free sulfur is left in the reactor. Additional carbonyl sulfide, 3 to 5 grams, may be recovered from the methanol remaining in the reactor. A total COS yield from such a process will be above 90 mole percent based on the sulfur charged.

When the process of Example 1 is repeated at 150° C., except that no catalyst is employed, no COS is formed.

*Example 2*

A 300 ml. stainless steel reactor is charged with 32 grams of sulfur and 3 grams of tetramethylguanidine, about 0.026 mole, and pressurized with carbon monoxide to 820 pounds per square inch gage (p.s.i.g.) at ambient temperature. The reactor is sealed and heated. When the contents of the reactor reach about 65° C., the reactor pressure drops rapidly and continues to drop to 300 p.s.i.g. at about 93° C. The reactor gases are then vented through a condenser cooled by a mixture of Dry Ice and acetone. There is recovered 27 grams of COS. Upon opening the reactor there is found unconsumed sulfur in an amount of 11.7 grams.

*Examples 3 to 10*

Carbonyl sulfide is prepared by charging a 300 ml. stainless steel reactor with 100 ml. of methanol, 0.5 gram mole (16 grams) sulfur and catalyst. The reactor is sealed, the contents heated to about 93° C. and the reactor is pressurized with carbon monoxide to 500 p.s.i.g. When the reactor pressure drops to 400 p.s.i.g., additional carbon monoxide is charged to return the pressure to 500 p.s.i.g. When no further pressure drop occurs, indicating completion of the reaction, the reactor gases are discharged through a trap cooled with a mixture of acetone and Dry Ice to collect the carbonyl sulfide formed. In the following table there are shown the catalyst and amount employed, the time of reaction to no pressure drop, and the yield of carbonyl sulfide.

| Examples | Catalyst, Grams | Time, Minutes | COS Yield, Grams |
|---|---|---|---|
| 3 | Sodium Methoxide—10 | 27 | 22.5 |
| 4 | Sodium Methoxide—5 | 23 | 22.0 |
| 5 | Tetramethylguanidine—5 | 35 | 22.0 |
| 6 | Tetramethylguanidine—5 [1] | 40 | 27.0 |
| 7 | Tetramethylguanidine—10 | 29 | 26.7 |
| 8 | Tetramethylguanidine—1 | 265 | [2] 21.9 |
| 9 | Triethylamine—5 | [3] | 22.5 |
| 10 | Potassium Hydroxide—5 | 20 | 17.0 |

[1] In Example 6, 16 grams additional sulfur are added to the original methanol containing the original 5 grams tetramethylguanidine and the reactor repressurized with carbon monoxide to 500 p.s.i.g. The reuse of the methanol and catalyst can be carried out many times without any adverse effect on the yield of carbonyl sulfide.
[2] An additional 4.1 grams of carbonyl sulfide is recovered from the methanol in the reactor giving a total yield of 26 grams.
[3] In Example 9 a substantial induction period occurs. However, once the reaction starts carbon monoxide is consumed rapidly and the pressure in the reactor drops to 180 p.s.i. at 93° C. Upon repressurizing with carbon monoxide to 500 pounds per square inch additional carbon monoxide is consumed as is indicated by a total additional carbon monoxide pressure drop of 500 pounds over a period of 25 minutes.

*Example 11*

A 300 ml. stainless steel reactor is charged with 100 ml. methanol, 16 grams sulfur and 2 grams tetramethylguanidine. The reactor is pressurized with carbon monoxide to 240 p.s.i.g. The reactor contents are heated to 93° C. The reactor pressure drops as reaction occurs. When no further pressure decrease is observed, the reactor gases are vented through the cold trap as before. There is recovered 12.35 grams carbonyl sulfide. There remains in the reactor 9 grams sulfur. The COS yield is about 95 mole percent based on the sulfur consumed.

*Example 12*

A 300 ml. stainless steel reactor is charged with 16 grams sulfur, 1.0 gram sodium methoxide and 2 grams tetramethylguanidine. The reactor is pressurized with carbon monoxide to 900 p.s.i.g. and then heated to 300° F. A maximum pressure of 1125 p.s.i.g. is reached in 25 minutes and no pressure drop is observed after 3 hours. When the reactor is cooled to room temperature, final pressure was 525 p.s.i.g. A yield of COS of 24.3 grams is collected in the cold trap from the reactor gases.

*Example 13*

A 300 ml. stainless steel reactor is charged with 32 grams of sulfur, 5 grams of sodium methoxide, 100 ml. of methanol and pressurized with CO to 750 p.s.i.g. The reactor contents are heated to 93° C. The pressure drops rapidly reaching 350 p.s.i.g. when the reactor contents are at 94° C. Thereafter the reactor is repressurized to 750 p.s.i.g. with carbon monoxide six times with a total uptake of 1900 p.s.i. CO. The reactor gases are vented through a cold trap as hereinbefore described to collect the COS produced. A yield of 50 grams of COS is prepared in 110 minutes. Three grams of sulfur are recovered from the methanol. The trapped out COS represents a 93 mole percent yield. Additional COS may be recovered from the methanol.

*Example 14*

A 300 ml. stainless steel reactor is charged with 74 grams n-butanol, 16 grams of sulfur, 2 grams of tetramethylguanidine and pressurized to 3200 p.s.i.g. with carbon monoxide at ambient temperature. The reactor contents are heated to 176.5° C. During the heat up the reactor pressure reaches a maximum of 3800 p.s.i.g. and thereafter drops. When no pressure drop is noted after the reactants are at 176.5° C., the reactor gases are vented as before. No sulfur remained in the n-butanol. By this process substantially all of the sulfur can be converted to COS.

Example 15

A 300 ml. stainless steel reactor is charged with 43 grams of a naphthalene fraction containing naphthalene, mono- and di-methyl naphthalenes. To the reactor there is added 21 grams sulfur and 1.0 gram potassium formate. The reactor is pressurized with carbon monoxide to 500 p.s.i.g. at ambient temperature. The reactor contents are heated slowly to 404° C. at which temperature the reactor pressure is 1200 p.s.i.g. When there is no further pressure drop, the reactor contents are cooled to room temperature, about 25° C. The pressure in the reactor is 300 p.s.i.g. By this process substantially all of the sulfur is converted to COS. A sample of the vented gas subjected to gas mass spectrographic inspection shows 28.8% COS present.

Example 16

A 300 ml. stainless steel reactor is charged with 60 grams toluene, 21 grams sulfur, 1.0 gram potassium formate, and pressurized to 850 p.s.i.g. at ambient temperature. The reactor contents are heated to 216° C. at which temperature the pressure in the reactor is 1250 p.s.i.g. When the pressure drops to 750 p.s.i.g. at 216° C., the reactor contents are cooled to about 25° C. and the reactor gases vented. A sample of the vented gas is submitted for gas mass spectrographic analysis. The vented gas contains 48.6% COS by volume.

Paraffinic hydrocarbons such as pentanes, hexanes, heptanes, etc. can be employed as liquid reaction mediums in place of the methanol, n-butanol, naphthalene fraction or toluene employed in the foregoing examples and the processes so carried out will produce COS in substantially equivalent yields.

Sodium carbonate, 10 grams, when substituted for sodium methoxide of Example 3 is sufficient catalyst for the production of about 90 mole percent COS in 25 to 30 minutes under the conditions of Example 3. The process of Example 3 when carried out employing 10 grams of potassium acetate in place of the sodium methoxide would produce substantially equivalent results. A mixture of 16 grams of sulfur, 100 ml. of carbon disulfide, 10 grams of potassium ethoxide pressurized to 100 p.s.i.g. with carbon monoxide and heated to 100° C. will produce at 90 to 95 mole percent yield of COS based on the sulfur consumed.

What is claimed is:

1. A process for the preparation of carbonyl sulfide which consists essentially of reacting carbon monoxide with sulfur in the presence of a catalytic amount of an alkali metal carboxylate at a temperature in the range of from 50 to 150° C. and carbon monoxide pressure in the range of 200 p.s.i.g. up to 5000 p.s.i.g.

2. A process for the preparation of carbonyl sulfide which consists essentially of reacting carbon monoxide with sulfur in the presence of a catalytic amount of an alkali metal formate at a temperature in the range of from 50 to 150° C. and carbon monoxide pressure in the range of 200 p.s.i.g. up to 5000 p.s.i.g.

3. A process for the preparation of carbonyl sulfide which consists essentially of reacting carbon monoxide with sulfur in the presence of a catalytic amount of an alkali metal acetate at a temperature in the range of from 50 to 150° C. and carbon monoxide pressure in the range of 200 p.s.i.g. up to 5000 p.s.i.g.

4. A process for the preparation of carbonyl sulfide which consists essentially of reacting carbon monoxide with sulfur in the presence of a catalytic amount of an alkoxide of a metal of Groups I, II and III of the periodic table at a temperature in the range of from 50 to 150° C. and carbon monoxide pressure in the range of 200 p.s.i.g. up to 5000 p.s.i.g.

5. A process for the preparation of carbonyl sulfide which consists essentially of reacting carbon monoxide with sulfur in the presence of a catalytic amount of tetramethylguanidine at a temperature in the range of from 50 to 150° C. and carbon monoxide pressure in the range of 200 p.s.i.g. up to 5000 p.s.i.g.

6. A process for the preparation of carbonyl sulfide which consists essentially of reacting carbon monoxide with sulfur in the presence of a catalytic amount of potassium formate at a temperature in the range of from 50 to 150° C. and carbon monoxide pressure in the range of 200 p.s.i.g. up to 5000 p.s.i.g.

7. A process for the preparation of carbonyl sulfide which consists essentially of reacting carbon monoxide with sulfur in the presence of a catalytic amount of sodium methoxide at a temperature in the range of from 50 to 150° C. and carbon monoxide pressure in the range of 200 p.s.i.g. up to 5000 p.s.i.g.

References Cited by the Examiner
UNITED STATES PATENTS

| | | | |
|---|---|---|---|
| 2,857,430 | 10/1958 | Applegath et al. | 260—553 |
| 2,874,149 | 2/1959 | Applegath et al. | 260—553 |
| 2,992,896 | 7/1961 | Applegath et al. | 23—203 |
| 2,992,897 | 7/1961 | Applegath et al. | 23—203 |
| 2,992,898 | 7/1961 | Applegath et al. | 23—203 |

MAURICE A. BRINDISI, *Primary Examiner.*